March 3, 1953 M. S. DUNKELBERGER 2,630,464

ELECTRIC MOTOR

Filed Jan. 3, 1950

INVENTOR.
Milton S. Dunkelberger
BY
Dybvig & Dybvig
HIS ATTORNEYS

Patented Mar. 3, 1953

2,630,464

UNITED STATES PATENT OFFICE 2,630,464

ELECTRIC MOTOR

Milton S. Dunkelberger, Dayton, Ohio

Application January 3, 1950, Serial No. 136,488

1 Claim. (Cl. 172—120)

This invention relates to electric motors and more particularly to electric motors utilizing a squirrel cage rotor.

The use of ducts in the rotors for cooling purposes is old, as clearly shown in the Keiley Patent No. 700,335, patented May 20, 1902; but, as clearly stated in this patent, it has been the prevailing opinion that the amount of iron in the core be not unduly reduced. It has been found, as will appear more fully from the description that follows, that in small fractional horse power squirrel cage rotors large amounts of iron may be cut out and removed without deleterious effects, but in some cases in addition to maintaining the rotor cool as well as circulating air adjacent the bearing, the stator and the coils, the torque is actually increased by removal of iron.

An object of this invention is to improve upon the characteristics of a motor utilizing a squirrel cage rotor, such that the temperature rise under normal load conditions is not deleterious. This has been accomplished by providing passages through the laminations forming the rotor such that the material between passages simulates fan blades used in forcing air through the rotor and thereby circulating the air around the bearings, the rotor shaft and the stator.

Another object of this invention is to remove metal from the laminations forming the rotor, to thereby reduce eddy current losses and hysteresis losses.

Another object of this invention is to provide a hollow cylindrical rotor wherein the dimensions of the magnetic path are substantially equal to the minimum dimensions of the magnetic path in the stator to thereby reduce eddy currents and hysteresis losses and at the same time provide a large ventilating area through the rotor.

Other objects and advantages reside in the construction of parts, the combination thereof and the mode of operation, as will become more apparent from the following description.

Referring to the drawings, Figure 1 is an end view of a rotor and a schematic view of a stator.

Figures 1, 2, 3:
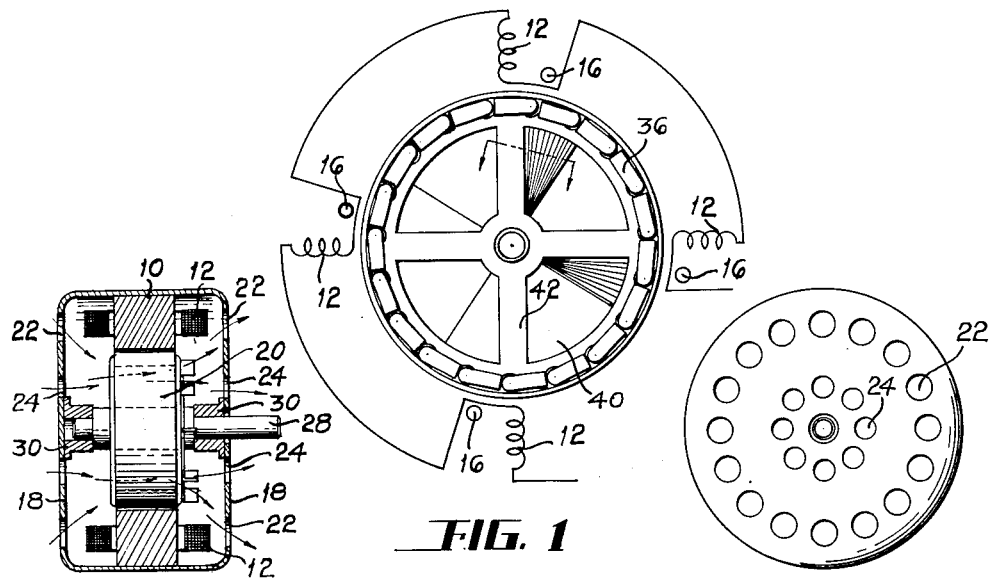
Figure 2 is a cross sectional view of the stator and the motor housing, the bearings and a side elevational view of the rotor.
Figure 3 is a side elevational view of an end bell or an end frame.
Figure 4:
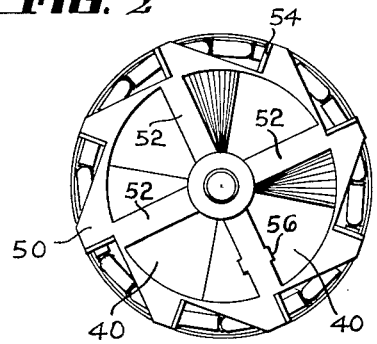
Figure 4 is an end view of the rotor, as viewed from the right of the rotor shown in Figure 2.

In the drawings, the reference character 10 indicates a laminated stator provided with the coil winding 12. As best seen by referring to Figure 1, a four pole motor has been used for purposes of illustration. Furthermore, shading rings 16, shown schematically in Figure 1, have been used to provide starting torque for starting the motor. End bells or end frames 18 may be used to enclose the stator and the rotor 20. The end frames 18 have been provided with a plurality of vents or openings 22 and 24 for use in admitting air to the rotor and stator on one side and for exhausting air on the opposite side. The rotor shaft 28 is journalled in bearings 30 secured to the end frames 18. The stator, the bearings, the end frames and the rotor shaft may be any conventional structure providing the end frames have the desired openings or vents.

The rotor 20 is provided with a plurality of laminations 32, each lamination being provided with the conventional peripheral aperture or slot, as the case may be, supporting the conductor bars 34. The conductor bars are arranged in an askew position, that is, extending diagonally across the laminations. The ends 36 project beyond the stack of laminations before being deflected against the side of the rotor and soldered thereto. The outer lamination 38 on each side of the rotor is preferably made from copper, or some other electrical conducting material. The askew arrangement of the conductor bars is conventional and any other suitable method of securing the ends in position may be used. The ends of the conductor bars in this particular disclosure have been soldered to the end laminations to insure good contact between the bars and the end laminations, so as to provide a good electrical circuit through the bars. The stack of laminations is press-fitted or otherwise mounted upon the armature or rotor shaft 28.

Each of the laminations is provided with a plurality of comparatively large apertures 40. These apertures extend from the hub portion outwardly towards the slats or apertures for the conductors bars. Spoke-like portions 42 extend outwardly from the hub portion to the rim of the armature between adjacent apertures 40.

Figure 5:
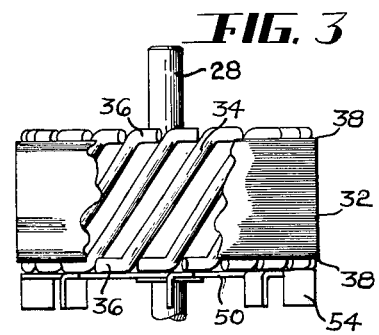
Figure 5 is a top plan view of the rotor with parts broken away so as to disclose the rotor bars.
Figure 6:
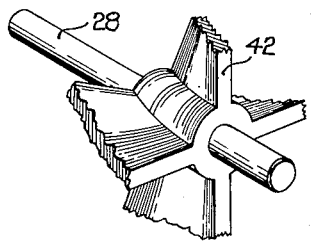
Figure 6 is a fragmentary, perspective view of the rotor showing the fan blade-like portions used in drawing air through the rotor.
Figure 8:
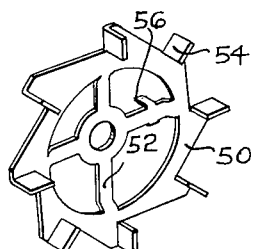
Figure 8 is a perspective view of the fan removed from the rotor.
Figure 7:
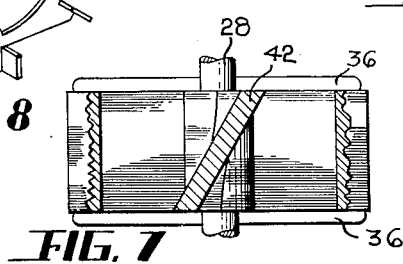
Figure 7 is another top plan view of a rotor having a portion of the periphery of the rotor broken away.

All of the laminations are stamped out on the same die or identical dies. In assembling, the laminations may be stacked on a jig so that each aperture in succeeding laminations is slightly offset. When the conductor bar is inserted, it is diagonally disposed, as clearly shown in Figure 5. Likewise, the spoke-like portions 42 are slightly offset. This results in the spoke-like portions functioning as fan blades like those in a screw propeller, so that as the rotor rotates, the spoke-like portions 42 pump air through the armature or rotor from one side to the other. The fan blades present a rather large air propelling area. The amount of metal that has been removed in the center, forming the aperture 40, is great compared with the amount of metal left. This is the very opposite of the teachings in the Keiley Patent No. 700,335 referred to above. The thickness of the iron forming the rim of the rotor is approximately equal to the minimum thickness of the magnetic path of the stator. The thickness of the rim is less than one-half of the length of each of the spoke-like portions 42.

Furthermore, in order to aid circulation of air, a fan 50, provided with spoke-like portions 52 registering with the spoke-like portions 42 and provided with fan blades 54, may be mounted adjacent the laminations on the air exit side of the armature or rotor to aid in forcing the air outwardly in proximity to the stator. This fan member 50 may consist of a metallic stamping and is held in position so as to rotate with the armature by a pair of ears or tongues 56 integral with one of the spoke-like portions 42. For many purposes the fan 50 is not needed.

In conducting tests upon the motor disclosed herein, it was found that the motor required 35 watts when idling and 47 watts when stalled. It developed 3¾ ounce starting torque measured on an arm 1½ inch long. The temperature rise when idling was 41° C. The temperature rise when stalled was 72.5° C.

Another motor having an identical field, or as near identical as they run in manufacturers' regular production, having the same type end bell, bearings, armature shaft and an armature having the same diameter, the same number of laminations, made from the same type of electrical steel, but having four $\frac{3}{16}''$ holes $\frac{9}{16}''$ away from the center of the armature shaft, was tested for comparison. This motor required 35 watts when idling and 54 watts when stalled. It developed 3⅓ ounce torque using an arm 1½ inch long. The temperature rise when idling was 77° C. The temperature rise when stalled was 90° C.

Further tests have been conducted showing similar results using the same stator with the two types of rotors, one like the one disclosed herein and the other like the one put out by the manufacturer, having four $\frac{3}{16}''$ holes in the rotor. These holes were placed at an angle, as a matter of fact, at the same angle as in the motor disclosed herein. In every instance, the temperature rise was far less when using an armature like the one disclosed herein than when using a standard production armature having four small holes.

There are probably three reasons for the difference in temperature rise and also for the difference in input power when stalled. These are: less eddy current losses, less hysteresis losses and better ventilation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A squirrel cage rotor for use in a stator, which stator is provided with stator windings creating a magnetic flux when energized, said magnetic flux following a magnetic path through the stator and the rotor, the magnetic path in the stator being restricted in portions thereof, said squirrel cage rotor including a shaft, a plurality of laminations press-fitted on the shaft, each of the laminations including a plurality of peripherally arranged holes or slots, conductor bars positioned in said holes or slots, said conductor bars extending diagonally, the holes or slots in adjacent laminations being slightly offset, each of said laminations having a plurality of large substantially fan-shaped openings for the circulation of air, the fan-shaped openings in each lamination being offset an equal distance from the adjacent lamination, the metal between the large openings forming radially disposed spoke-like portions cooperating to form screw-like helical propeller blades, the metal of the laminations between the upper margins of the fan-shaped openings and the periphery of the rotor having a thickness on the order of the thickness of the restricted portion of the stator, and a fan of sheet metal stamping having openings registering with the large fan-shaped openings in the laminations so as to form radially disposed spoke-like portions registering with the spoke-like portions of the laminations, one of said spoke-like portions of the fan being provided with a pair of ears engaging opposite sides of one of the spoke-like portions of the laminations for causing the fan to rotate with the rotor.

MILTON S. DUNKELBERGER.

REFERENCES CITED

The following references are of record in the file of this patent:

UNITED STATES PATENTS

| Number | Name | Date |
| --- | --- | --- |
| 885,009 | Behrend | Apr. 21, 1908 |
| 1,043,887 | Wiard | Nov. 12, 1912 |
| 1,351,270 | Wilkinson | Aug. 31, 1920 |
| 1,950,197 | Taylor | Mar. 6, 1934 |
| 2,248,167 | Elsey | July 8, 1941 |
| 2,437,922 | Rose | Mar. 16, 1948 |